June 9, 1931.  E. H. MESSITER  1,808,930
WEIGHER
Filed April 13, 1927   6 Sheets-Sheet 1

INVENTOR
*Edwin H. Messiter*
BY
ATTORNEY

June 9, 1931. E. H. MESSITER 1,808,930
WEIGHER
Filed April 13, 1927   6 Sheets-Sheet 2
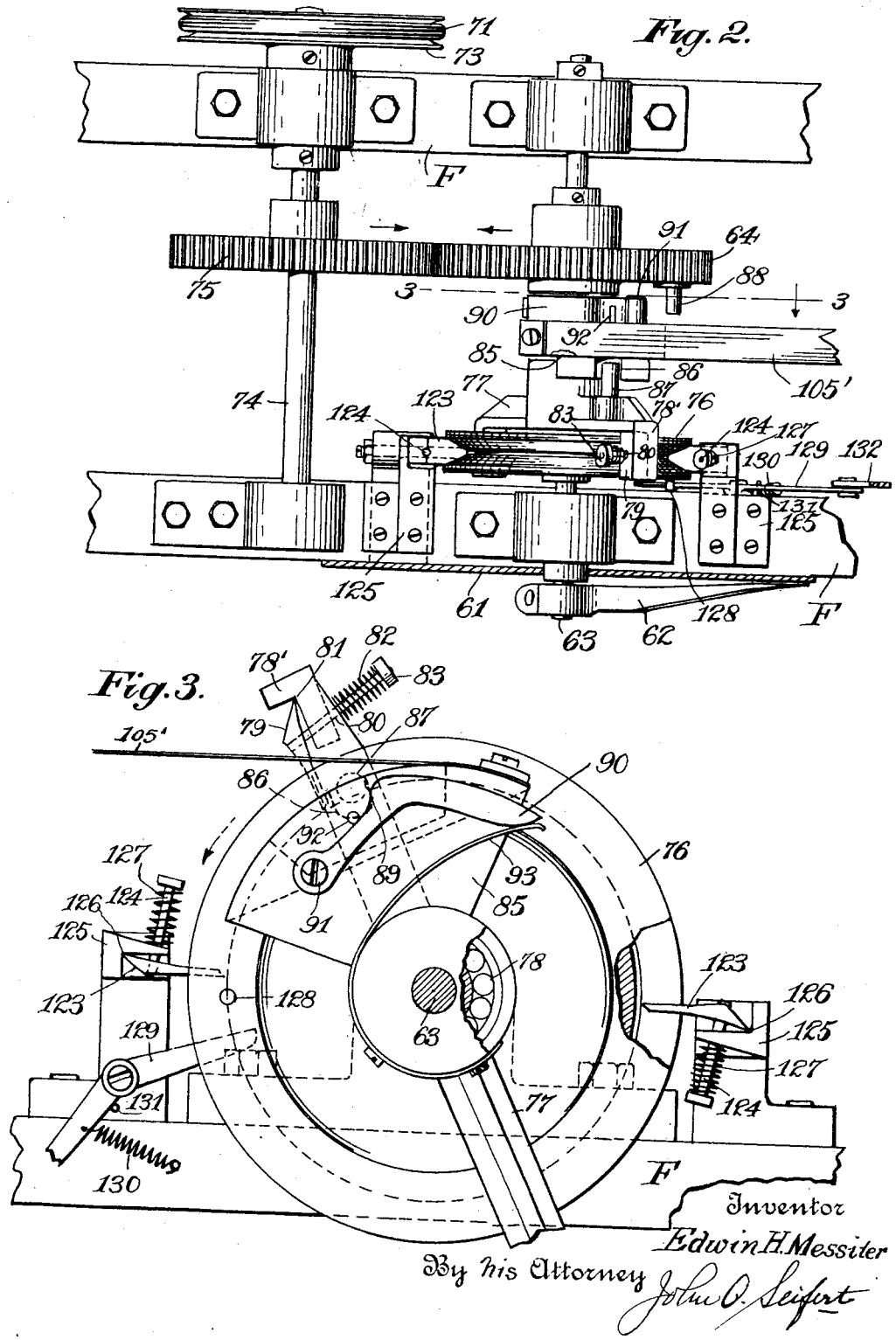

June 9, 1931.  E. H. MESSITER  1,808,930
WEIGHER
Filed April 13, 1927    6 Sheets-Sheet 3
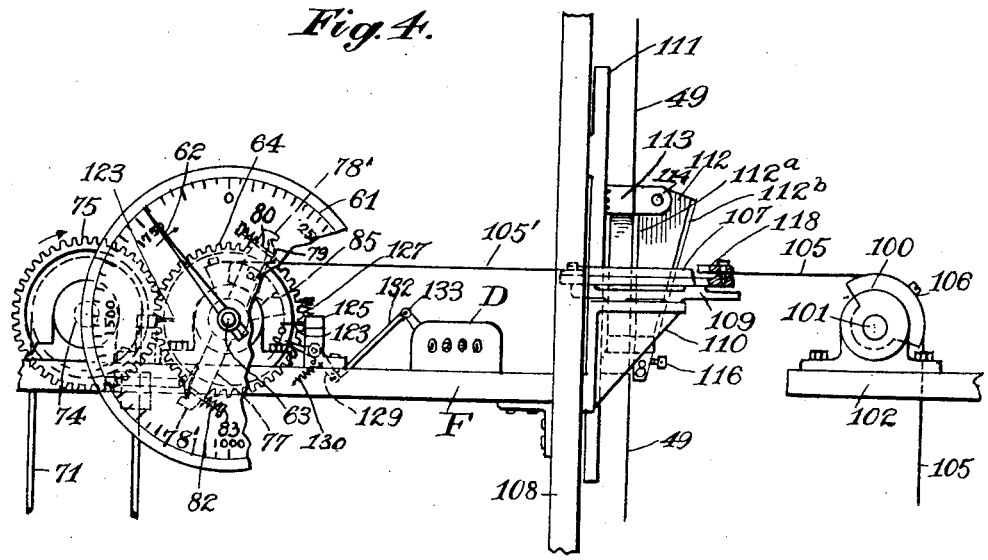
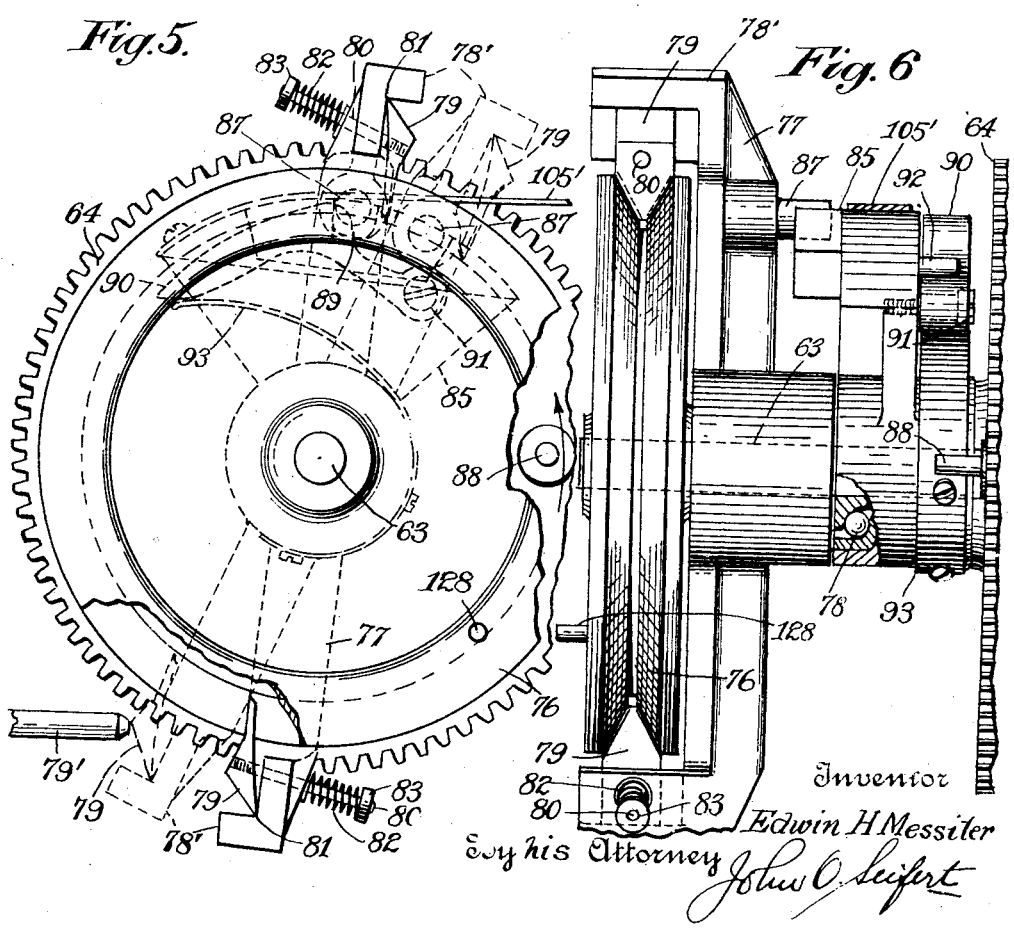
Inventor
Edwin H Messiter
By his Attorney

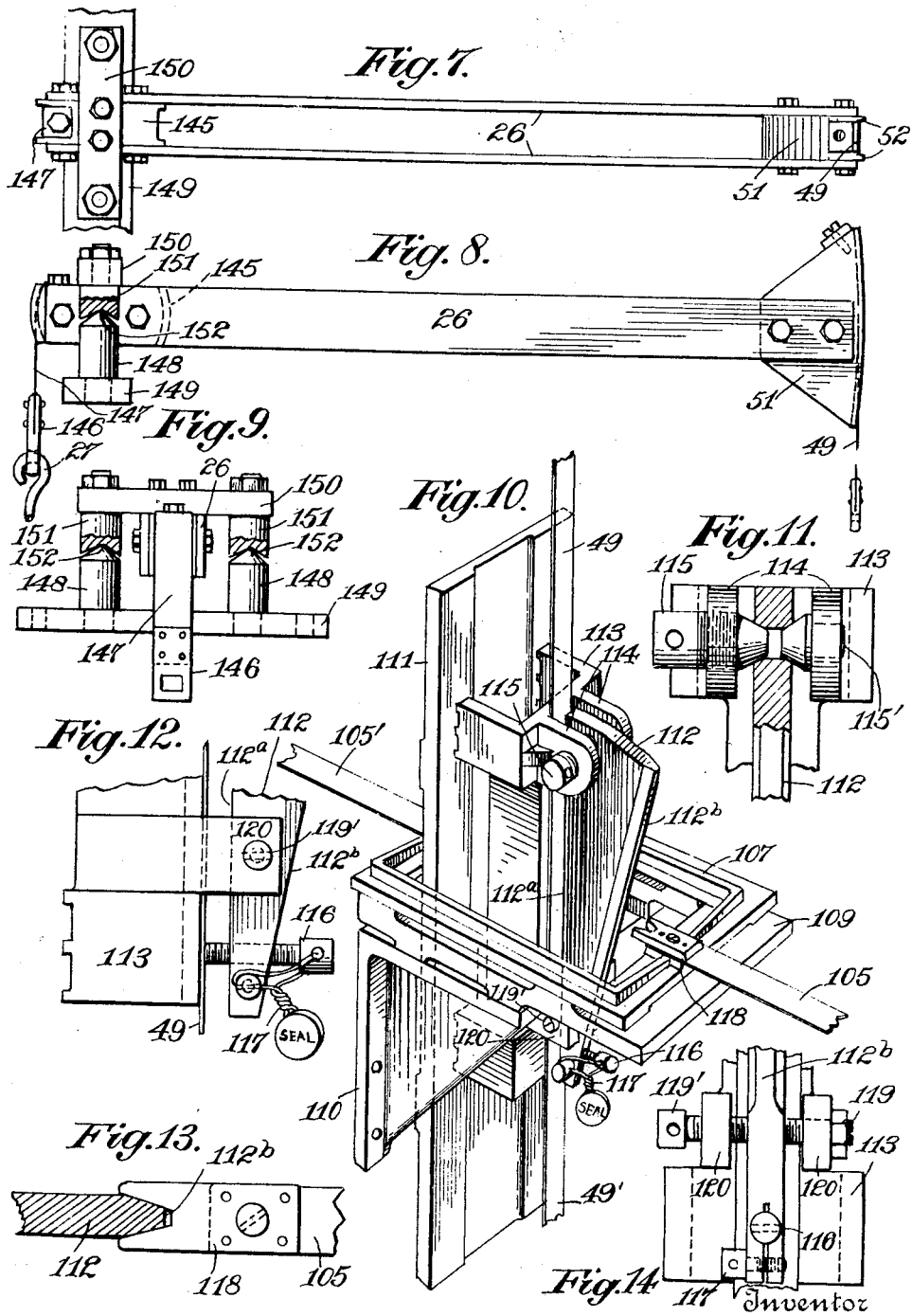

June 9, 1931. E. H. MESSITER 1,808,930
WEIGHER
Filed April 13, 1927 6 Sheets-Sheet 5
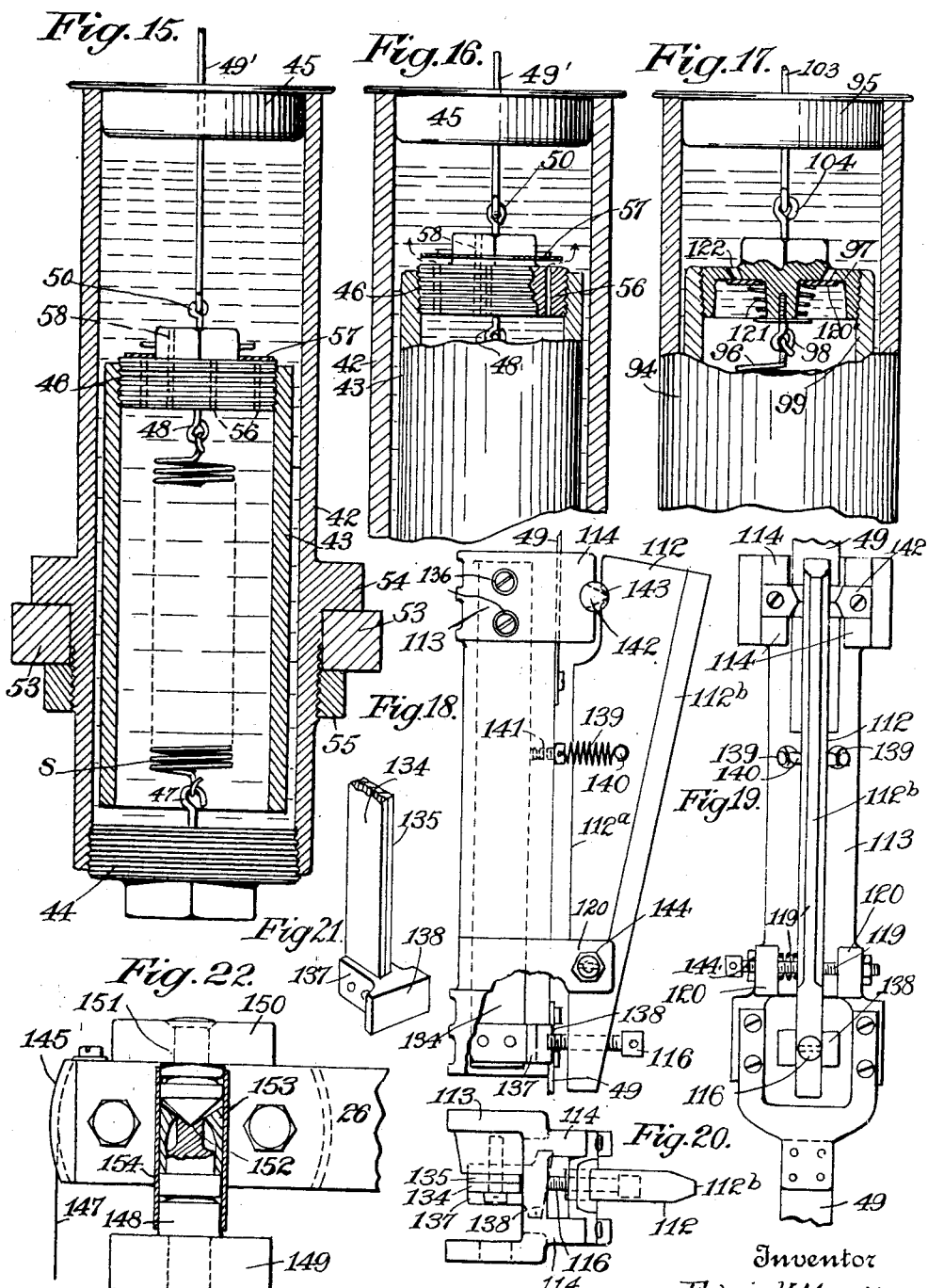
Inventor
Edwin H Messiter
By his Attorney June 9, 1931.   E. H. MESSITER   1,808,930
WEIGHER
Filed April 13, 1927   6 Sheets-Sheet 6

Inventor
Edwin H. Messiter
By his Attorney John O. Seifert

Patented June 9, 1931

1,808,930

UNITED STATES PATENT OFFICE

EDWIN H. MESSITER, OF NEW YORK, N. Y., ASSIGNOR TO MERRICK SCALE MFG. COMPANY, OF PASSAIC, NEW JERSEY, A CORPORATION OF NEW JERSEY

WEIGHER

Application filed April 13, 1927. Serial No. 183,255.

This invention relates to weighers embodying scale mechanism arranged with means for supporting a load and balance mechanism operative to normally maintain the scale mechanism in the no load condition thereof in a position of equilibrium and to counterbalance an applied load, and it is the object of the invention to provide an improved weigher of this character having combined therewith weight indicating or registering means independent of the scale mechanism to indicate the weight of successive weighings and actuating means for the indicating means adapted to be connected therewith at a predetermined point in the operation of the actuating means to actuate the indicating means, and such connection controlled by means positioned by the movement of the scale mechanism out of its position of equilibrium proportional with the weight of a load, and without interfering with the free balancing movement thereof, co-operating with said actuating means.

Another object of the invention is to provide in a weigher of this character embodying scale mechanism of the weighing or scale beam type having means connected therewith to support a load and balancing means to maintain the beam normally in a position of equilibrium and counterbalance an applied load and permit the beam to move out of said position of equilibrium proportional to the weight of a load on the load support, weight indicating means independent of the scale mechanism, a rotatable actuator for the indicating means normally disconnected therefrom, means with which said actuator is adapted to be connected and to be actuated with the actuating means when movement is transmitted thereto by the actuating means for transmitting the movement of the actuating means to the indicating means, and means controlled by the movement of the beam out of its position of equilibrium to co-operate with the means for connecting the indicating means with its actuating means to control said connection and thereby the actuation of the indicating means proportional with the weight of the load.

A further object of the invention relates to an automatic weigher of this character embodying scale mechanism having means for supporting a portion of a travelling material carrying conveyer and balancing mechanism operative to maintain the scale in a position of equilibrium with no load on the conveyer and counterbalance a load on the conveyer travelling over the load support, and weight indicating or registering means independent of the scale mechanism with an actuator for the indicating means rotatable in synchronism with the rate of travel of the conveyer and adapted to have one revolution imparted thereto to a predetermined length of conveyer travel with means operative to connect the actuator with the indicating means at successive predetermined lengths of conveyer travel and the connection with said actuator with the indicating means controlled by means positioned by the scale mechanism as it is moved out of its position of equilibrium by a load upon the conveyer co-operating with the connecting means, and without interfering with the free movement of the scale mechanism, to thereby actuate the indicating means for determining the weight of succesive increments of material transported by the successive units of predetermined conveyer length.

It is another object of the invention to provide in a weigher of this character means to indicate the number of successive weighings, or to totalize and indicate the weight of successive weighings of successive increments of material transported by the conveyer.

It is still a further object of the invention to provide in a weigher of this character adjustable means to control the connection of the actuator for the weight indicating means to balance off the tare weight and to compensate for expansion and contraction of the mechanism effected by variations in temperature and changes in atmospheric conditions.

Another object of the invention is to provide in a weigher of this character improved compensating variable resistance means or balancing mechanism to normally maintain the weighing mechanism in a position of equilibrium with no load applied and to offset or counterbalance the weight of an applied load and permit of the movement of the weighing mechanism out of its normal position of equilibrium proportional with the weight of the load.

A further object of the invention relates to an improved mounting of a weighing or scale beam in weighing mechanism.

Other objects and advantages will hereinafter appear.

In the drawings accompanying and forming a part of this specification, Figure 1 is a perspective view of a weigher embodying my improved scale mechanism and showing the same in relation to and adapted for use in weighing and indicating the weight of successive increments of material transported by a conveyer, with a part of the indicator broken away to show the actuating means therefor and only so much of the conveyer mechanism being shown as is deemed essential for an understanding of the invention.

Figure 2 is a detail plan view on an enlarged scale of the indicator, the means for actuating the same and releasably connecting the actuating means with the indicator.

Figure 3 is a view, partly broken away, taken substantially on the line 3—3 of Figure 2 looking in the direction of the arrow of the means for releasably connecting the indicator actuating means with the indicator.

Figure 1:
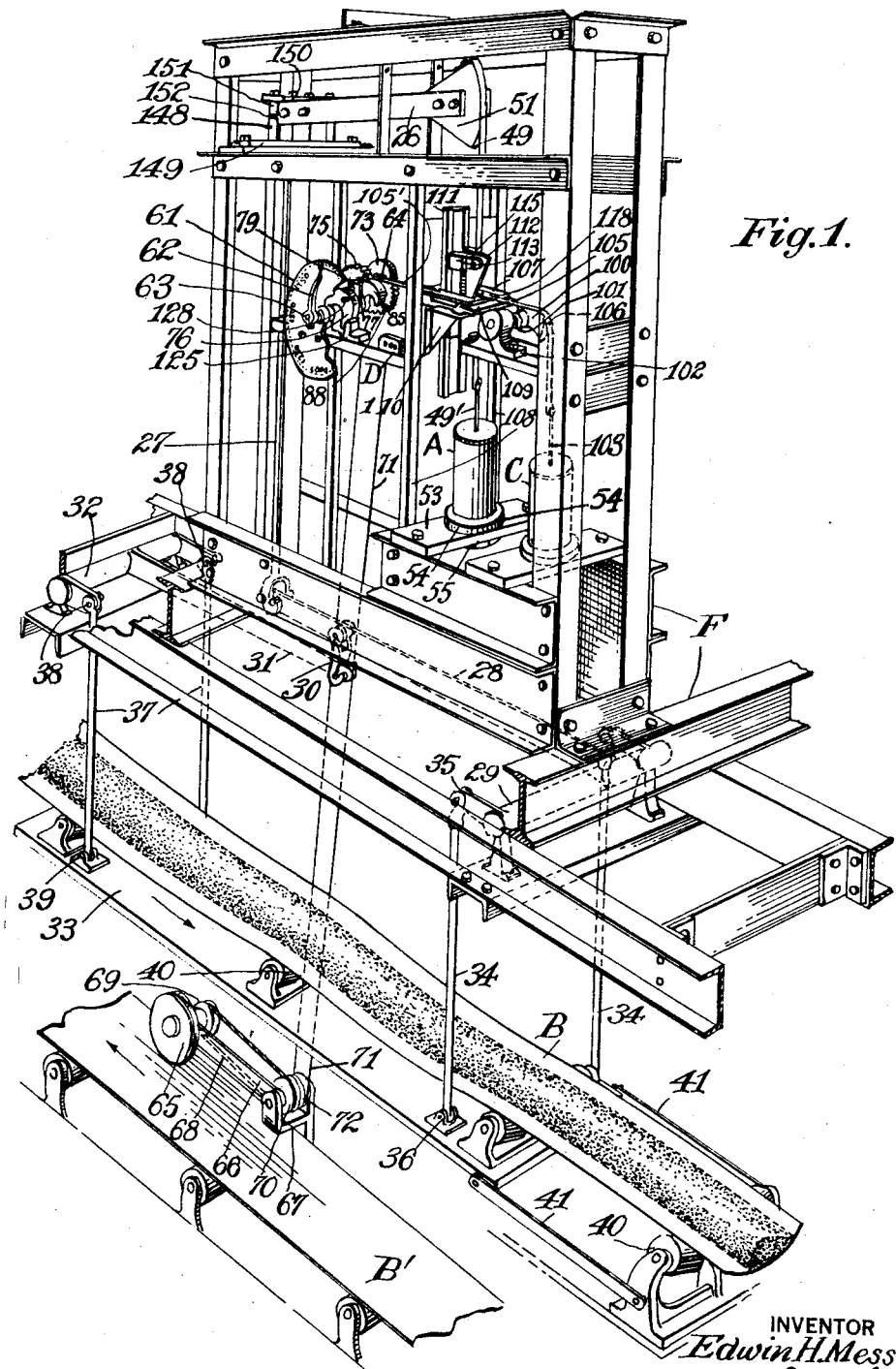

Figure 4 is a front elevation, partly broken away, of the indicator and its actuating means, and the means controlled from the movement of the scale mechanism out of a normal position of equilibrium for controlling the connection of the indicator actuating means with the indicator proportional to the weight of a load to actuate the indicator to indicate the weight of successive weighings, and also showing means to totalize the number or revolutions of the indicator and thereby the weight of successive weighings.

Figure 5 is a front elevation of the means for connecting the indicator actuating means with the indicator and showing the connector in dash lines in normal position and in full lines in indicator advanced position.

Figure 6 is a side elevation of the parts shown in Figure 5.

Figure 7 is a plan view and Figure 8 is a side elevation of a scale or weighing beam constituting a part of the scale mechanism and showing an improved fulcrum support therefor, and also showing the connection of the balancing mechanism thereto as well as the connection of the means positioned by the scale mechanism when moved out of its position of equilibrium for controlling the actuation of the indicator by its actuating means proportional with the weight of a load.

Figure 9 is an end elevation of the scale beam fulcrum support, partly in section, and looking at the left of Figure 8.

Figure 10 is a perspective view of the means, including a calibrated gauge plate, positioned by the scale mechanism when moved out of its normal position of equilibrium to co-operate with means forming a part of the means for releasibly connecting the indicator with its actuator for controlling the connection of the actuator with the indicator and thereby the actuation of the latter.

Figure 11 is a sectional detail view to show the mounting of the calibrated gauge plate forming a part of the means shown in Figure 10 positioned by the movement of the scale mechanism for controlling the actuation of the indicator.

Figure 12 is a detail side elevation of means for adjustably positioning the gauge plate of the means for controlling the actuation of the indicator.

Figure 13 is a detail plan view of a linear movable stop member forming a part of the means for connecting the indicator with its actuator and showing the same in operative relation with the gauge plate of Figure 10, shown in section, for limiting the movement of said connecting means of the indicator with its actuator.

Figure 14 is a detail view in end elevation showing means for guiding the gauge plate shown in Figure 10 in its movement transmitted thereto by the scale mechanism.

Figure 15 is a longitudinal sectional view of means operative for normally maintaining the scale mechanism in a position of equilibrium with no load applied and for counterbalancing a load and permit movement of the scale mechanism out of its position of equilibrium proportional to the weight of a load and showing the parts in normal position.

Figure 16 is a sectional view of the upper portion of the parts shown in Figure 15, showing the parts in the position they will assume when a load is applied to the scale mechanism and the manner of relieving the force applied to said means when moved by the scale mechanism out of position of equilibrium.

Figure 17 is an elevational view, partly in section to show the interior arrangement thereof, of means for imparting return movement to the means for connecting the indicator with its actuator to urge said means to a predetermined position of rest and retard said return movement.

Figure 18 is a side elevation, partly in section, and Figure 19 an end elevation of modified means for mounting the gauge plate shown in Figure 10 and the connection thereof with the scale mechanism, and having combined therewith means for automatically adjusting the same by temperature controlled means for compensating for variations in the parts effected by changes in atmospheric conditions.

Figure 20 is a view looking at the top of Figure 18.

Figure 21 is a perspective view of a portion of the temperature controlled means for effecting automatic adjustment of the gauge plate.

Figure 22 is a sectional side elevation of a modification of the scale beam fulcrum support shown in Figure 9.

Figure 23:
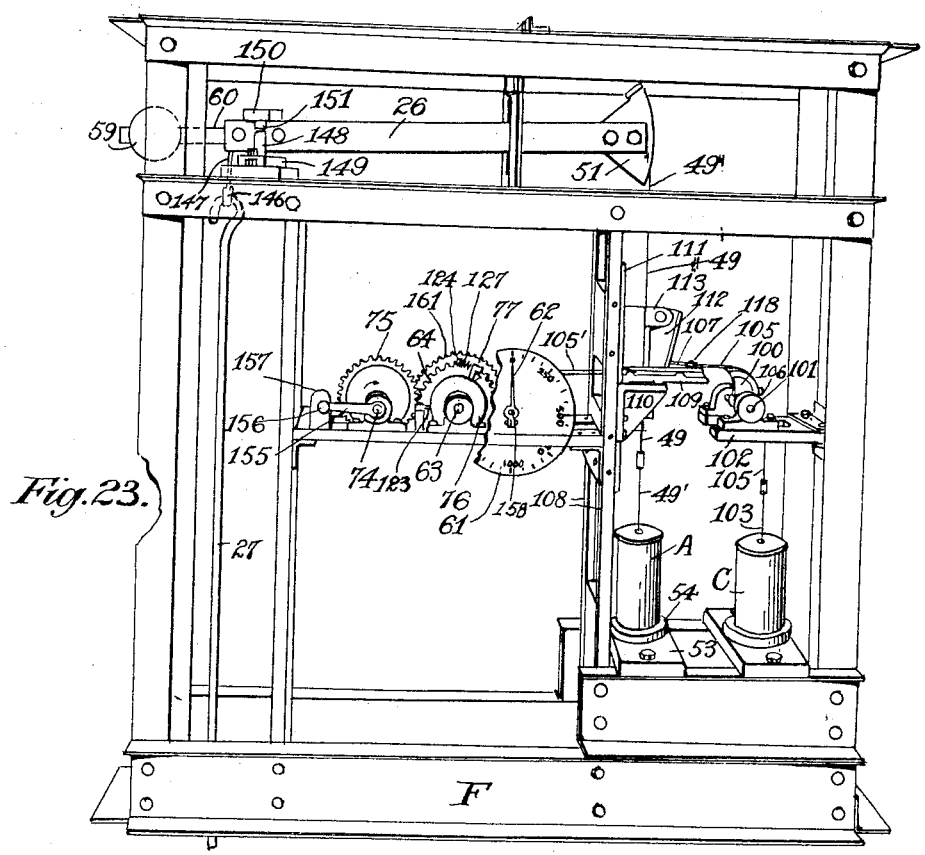

Figure 23 is a cabinet and front elevational view of the scale mechanism showing an arrangement of manually operating the actuating means for the indicator adapted for intermittently operative weighers and platform scales.

Figures 24, 25:
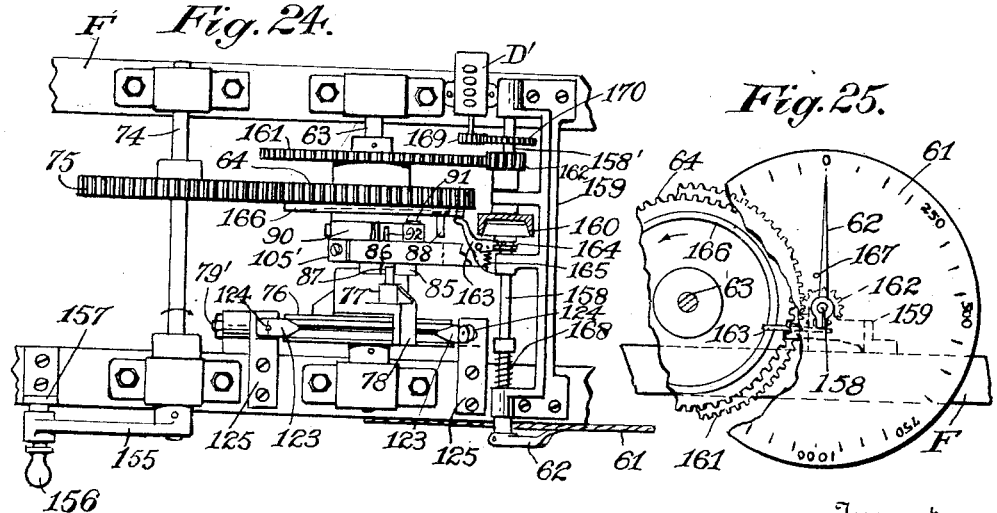

Figure 24 is a plan view of the weight indicating means, its actuating means and means for releasably connecting the actuating means with the indicating means, the indicating means being adapted to indicate or register the weight of successive weighings and the totalizing of successive weighings; and Figure 25 is a view of the indicating means for the successive weighings and its actuating means shown in Figure 24, partly broken away.

The embodiment of the invention shown in Figures 1 to 17, inclusive, is adapted as an automatic weigher for automatically weighing and indicating the weight of successive weighings of material transported by successive predetermined lengths of travel of a material carrying conveyer and means to totalize the weight of successive individual weighings of material transported and weighed.

In carrying out the invention scale mechanism is provided the operative parts of which are mounted upon a suitable supporting frame (designated in a general way by F). The scale mechanism embodies a scale or weighing beam 26 having a fulcrum support upon the framework. The scale beam is connected at one side of its fulcrum support by a rod 27 with one end of a lever 28 carried by a rocker 29, said lever having a link connection 30 intermediate the ends thereof with the end of a second lever 31 carried by a rocker 32. In the use of the scale mechanism as a platform weigher the load supporting platform is suitably carried by the levers 28, 31. In the arrangement shown a platform 33, which is in the nature of a floating platform, is suspended from the rockers 29, 32 by links 34, pivotally connected at one end to arms fixed to the rocker 29, as at 35, and at 36 adjacent one end and opposite sides of the platform, and a pair of links 37 pivotally connected to arms fixed to the rocker 32, as at 38, and at 39 adjacent the end of the platform opposite to the connection of the links 34. The platform is adapted to support a portion of a travelling material carrying way or conveyer in the form of a belt B passing around drums (not shown) operated from a suitable source of power with the upper stretch of the belt supported on rollers 40 arranged to form the conveyer as a trough, said trough forming rollers also being mounted upon the platform 33. To prevent longitudinal swaying of the platform it is connected at one end by links 41 with a fixed part of the support for the rollers 40. While the platform 33 has been described as being particularly adapted for supporting a portion of a travelling material carrying way or belt it is to be understood that the same may be adapted for use with bucket conveyers. Balancing mechanism is provided for maintaining the beam 26 in a normal position of equilibrium with no load applied to the conveyer B, and said mechanism being adapted to offset or counterbalance a load on the conveyer travelling over the platform and permit of the beam to move out of its position of equilibrium proportional to the weight of a load on that portion of the conveyer travelling over the support or platform, this mechanism embodying a compensating variable resistance (designated in a general way at A in Figures 1 and 23) connected to the beam at the side of its pivotal support opposite to that to which the levers 28, 31 are connected. This balancing mechanism (Figures 15 and 16) comprises a calibrated coiled tension spring S and a combined fluid, such as mercury, carrying dash pot 42 and float 43. The dash pot is in the form of a tube having an adjustable closure 44 in one end to constitute the bottom and a removable cover 45. The float is in the nature of a plunger and comprises a tubular member engaged in the fluid in the pot with the lower end open to the fluid and the upper end closed, as by a removable closure 46 to facilitate the construction of the float. The spring is arranged within the float and connected, as at 47, at one end to the bottom of the pot and at the other end, as at 48, with the closure for the float and connected to the weighing beam by a wire 49′ connected to the float, as at 50, and passing through an opening in the closure 46 and connected to a strap 49, the wire 49′ being connected to the spring through the connection of the float, the strap 49 being connected to a head 51 (Figures 7 and 8) carried by the end of the weighing beam with the strap engaged and guided in a recess 52 in said head arranged in an arc of a circle whose center is in the fulcrum support of the beam. The pot is mounted upon the framework by engaging the same in an opening in a transverse member 53 fixed upon the framework with a flange 54 extending laterally from the pot engaging at one side of said plate and a collar 55 threaded onto the pot engaging at the opposite side of said plate. The float head has ports 56 therethrough controlled by a valve in the form of an annular plate 57 slidable in relation to a boss extending outward from the head and adapted to have movement between the head and the ends of a pin in the head boss projecting laterally thereof. The float head has also a relief port 58 therethrough opening into the interior of the float and to the pot. The valve 57 is normally positioned by gravity to close the ports 56 and maintain said ports closed during the movement of the float by the beam out of position of equilibrium by a load applied thereto whereby not only the spring but also the float acting on the fluid above the same will resist the movement of the beam, the port 58 permitting a slow or restricted flow of fluid from above to below the float. However, when the load is removed and the beam is returned to its normal position by the contracting force of the spring S the float will be moved in the opposite direction and the force of the fluid within the float passing through the ports 56 will unseat the valve and open the interior of the float to the pot above the float and permit of the ready flow of the fluid through said ports. To balance off the tare or static load of the suspended length of the conveyer so that the weigher will assume its position of rest or equilibrium when there is no load on the conveyer passing over the platform a weight 59 is adjustably mounted on a beam extension 60 (Figure 23).

To indicate the weight of successive increments of material transported by the conveyer B an indicator or register is provided and illustrated as comprising a dial 61 having calibrations or graduations circumferentially disposed about the same and a hand or pointer 62, one of which is rotatable relative to the other, in the present instance the dial being fixed and the pointer is fixed to a shaft 63 rotatably mounted upon the framework concentrically of the dial. The pointer is moved relative to the dial by an actuator in the form of a toothed wheel or gear 64 loose on the shaft 63 rotatable in synchronism with the rate of travel of the conveyer and having one revolution imparted thereto for each predetermined unit of conveyer travel. This wheel is driven from the conveyer by a roll or friction wheel 65 (Figure 1) rotatably carried by an arm 66 pivotally carried by a bracket 67 fixed upon the conveyer support, said wheel 65 engaging by gravity with the return stretch B' of the conveyer to be frictionally driven thereby. The rotation of said wheel 65 is transmitted to the actuator wheel 64 by a belt 68 passing around a pulley 69 rotatable with the wheel 65 and a pulley 70 rotatably carried by the bracket 67, the rotation of said latter wheel being transmitted by a belt 71 passing around a pulley 72 rotatable with pulley 70 and a pulley 73 fixed to a shaft 74 journalled in brackets on the framework to rotate on an axis parallel with the axis of the pointer carrying shaft 63, and the rotation of said shaft transmitted to the actuator wheel 64 by a gear 75 on said shaft meshing with the teeth of the actuator wheel.

The actuator wheel is adapted to be releasably connected or coupled with the indicator pointer upon each revolution thereof, and the connection of the actuator wheel with and the actuation of the indicator shaft determining the weight of the increment of material transported by a predetermined length of conveyer travel. To releasably connect or couple the actuator with the indicator a wheel or disk 76 (Figures 2 to 6) is fixed to the pointer or indicator carrying shaft 63, said wheel being arranged with a groove in the periphery of V shape in cross section. A connector frame 77 is loosely mounted by a ball bearing 78 on the indicator shaft in juxtaposed relation to the wheel 76 to have to and fro or oscillatory movement, said frame having diametrically oppositely extending arms and each arm having a laterally extending member 78' to overhang the wheel 76 and carrying means to engage with and couple the indicator wheel 76 with the frame when the frame is moved in the direction of movement of the actuator wheel 64. This means in the present construction comprises dogs 79 having a part to engage in and shaped to conform to the V groove of the indicator wheel and to be frictionally impinged against the wall of said groove thereby connecting the frame with the wheel. The dogs are carried at one end of a stem 80 mounted for longitudinal sliding movement in the overhanging portion 78' of the connector frame, the dogs being arranged with a knife edge bearing for engagement and support for rocking movement in the corner of an angle portion formed in the overhang of the connector arms, as shown at 81 in Figure 5. The end of the dog carrying stems opposite to that upon which the dogs are mounted extend beyond the back of the connector arm with a spring 82 coiled about the same and confined between the connector arm and an abutment 83 on the stem to normally urge the stem and dog to a predetermined position. The dog carrying stems are so arranged that they will prevent movement of the dogs when the connector frame is moved by the actuator wheel and thereby cause the dogs to impinge against the wall of the wheel groove to frictionally couple the two together, and permit movement of the dogs relative to and the release thereof from the wheel when the frame is moved in reverse direction. Furthermore, by arranging the dogs on the connector frame 180 degrees apart there is no tendency of the dogs as they are impinged upon the indicator wheel to cause the connector frame to bind upon its carrying shaft.

The actuator wheel 64 is releasably connected or coupled with the indicator wheel actuating frame 77 through a sector 85 arranged with a recess 86 in the side for the engagement of a pin 87 extending laterally from said frame 77, the pin being of less diameter than the cross sectional area of the recess to permit of a slight free movement between the frame and sector. The actuator 64 is connected or coupled with the sector and thereby with the frame and indicator wheel 76 by a pin 88 adapted to be engaged in and with a wall of a recess 89 of a latch 90 at a predetermined point in the rotation of the actuator 64, said latch being pivotally supported at 91 on the sector 85 and normally urged in an outward direction into engagement with a stop pin 92 fixed in and projecting laterally from the sector by a spring 93.

The sector and frame 77 are normally yieldingly urged to a position of rest in a direction opposite to that in which they are moved by the actuator 64 and said movement retarded by a combined spring and dash pot arrangement, shown in a general way at C in Figures 1 and 23, and comprising a tubular receptacle or pot 94 carrying a fluid, such as mercury or oil therein, said tube having a removable closure 95 for an opening in the top (Figure 17). A coiled spring 96 is connected at one end to the bottom of the receptacle in a manner similar to that shown in the scale balancing mechanism shown in Figure 15, and the other end connected, as at 98, to a closure 97 in the upper end of a tubular float or plunger 99 immersed in and open at the bottom to the fluid in the pot. The spring and float are connected to a sector 100 fixed to a shaft 101 rotatably supported by a bracket 102 by a wire 103 extending through an opening in the closure 95 and connected to the float, as at 104, and thereby with the spring, said wire being connected to a strap 105 attached to the sector 100 by a screw 106 and to an open frame slide 107 mounted and guided to have linear sliding movement in a horizontal plane upon an open guide frame 109 mounted upon a bracket 110 fixed to a pair of uprights 108 of the framework, the slide being connected to the connector 85 of the actuator connecting means by a strap 105'. The movement imparted to the actuator connector means by its yielding actuating means C is limited by the sliding frame abutting against a vertical plate 111 fixed to the frame members 108 to extend through the slide 107, slide supporting frame 109 and bracket 110.

The movement of the connector means 77, 85 by the actuator 64 and thereby the actuation of the indicator means is controlled by the movement of the scale beam out of its normal position of equilibrium, and comprises a calibrated or graduated gauge member or plate 112 carried by a slide 113 engaging with and guided by the guide plate 111 to have movement in a vertical direction at a right angle to and intersecting the path of movement of the slide 107, said movement being imparted to the gauge plate carrying slide 113 by the movement of the scale beam by attaching said slide to the strap 49 connecting the scale beam with the balancing mechanism A. The gauge plate is pivotally mounted at the upper end between a pair of ears 114 extending laterally from the slide by a pair of studs 115, 115' fixed in the slide ears having a conical portion for engaging correspondingly formed portions of an opening through the gauge plate, as clearly shown in Figure 11, one of the studs, as 115', being mounted in fixed position while the other stud 115 has screw threaded connection with the slide ear for axial adjustment of said stud to permit of the engagement of the gauge plate between said studs and said studs due to the conical bearing portions thereof holding the gauge plates against lateral displacement. The one edge 112$^a$ of the plate is arranged to extend in a plane with its direction of movement while the opposite edge 112$^b$ is inclined to the edge 112$^a$, or at an angle to the vertical in the operative position thereof and having the opposite side portions of said edge converging thereto from the sides of the gauge plate, as clearly shown in Figures 10 and 13. The plate is adjustable in a direction toward and away from the slide 113 to change the angle of the inclined edge of the gauge plate relative to the vertical or the guide plate 111 by an adjustable abutment 116 in the form of a set screw threaded into an opening in the gauge plate extending in a direction toward the slide 113 and the end of which screw is adapted to about against said slide. The gauge plate when once adjusted is locked in adjusted position by a wire passed through an opening in the head of the set screw and a stud fixed in the gauge plate with the ends of the wire sealed by a sealing member, as shown at 117 in Figure 12. The movement of the connector means 77, 85 by the actuator 64 is limited by a recessed portion of V shape in a stop 118 fixed upon the slide 107 engaging with the calibrated or graduated edge 112$^b$ of the gauge plate, the walls of said recess being arranged at the same angle as the converging marginal portions of the calibrated edge of the gauge plate. The stop 118 is preferably arranged in line with the connection of the strap 105 with the slide 107 and centrally of the latter, and the gauge plate is positioned relative to said stop by a pair of adjustable abutments in the form of set screws 119, 119' threaded into openings in a pair of ears 120 extending laterally from the lower portion of the slide 113 and in parallel relation to the slide ears 114 to engage at opposite sides of the gauge plate, as shown in Figure 14. The abutment 119 is adjusted relative to the gauge plate and then locked in adjusted position by a nut threaded onto the outer end thereof, when the screw 119' is adjusted in an abutting relation to the gauge plate to permit of free guiding movement of the latter between the abutments.

As movement is imparted to the connector means 77, 85 by engagement of the actuator pin 88 in the latch recess 89 the engagement of said pin with the wall of said latch recess transmits the movement of the actuator 64 to said connector means and through the dogs carried by the member 77 to the indicator wheel 76 and indicator, said movement being against the force of the yielding return means C for the connector means. As the stop 118 abuts against the gauge plate, which has been positioned transversely to the movement of said stop proportional to the movement of the scale beam out of its position of equilibrium by the load on the load support, the movement of the connector means 77, 85 is arrested. However, as the actuator 64 is continuously rotated the actuator pin 88 will ride up the wall of the latch recess and move the latch against the action of the spring 93 thereby disconnecting or uncoupling the actuator from the connector means and indicator. By this movement of the indicator wheel 76 the indicator 62 will be moved relative to the dial proportional to and indicate the weight of the load. As soon as the actuator pin 88 rides out of the latch recess the connector means will be returned to its normal position of rest through the force of the spring 96 of means C, such movement being retarded by the plunger or float 99 in the fluid in pot 94 by a valve plate 120' yieldingly seated against the inner side of the float closure 97 by a spring 121 to close ports 122 through said head, which ports are opened to the interior of the float through the movement imparted to the float by the connection of the actuator 64 with the connector means 77, 85 through the force of fluid above the float passing through the ports 122 and acting on the valve against the action of the spring 121. As the return movement is imparted to the connector frame 77, as indicated by the arrow in Figure 3, the dogs 79 are released from the indicator wheel 76 and participating return movement of the indicator wheel is prevented by detents 123 similar to the dogs 79 co-operating with the wheel of the V groove in the indicator wheel. These detents are carried by stems 124 movably mounted in openings in brackets 125 mounted upon the scale framework, said brackets having angular portion for the engagement of a knife edge of said detents as shown at 126, the detents being normally urged to a predetermined position by a spring 127 coiled about the detent carrying pins and confined between the brackets and a head on said pins. These detents function in a reverse manner to the dogs 79 in that when the indicator wheel 76 is moved by the actuator 64 such movement of the wheel will release the detents therefrom, but any movement of said wheel in reverse direction will cause the detents to impinge upon the groove wall and hold the wheel against movement. As the connector frame approaches its normal position of rest imparted thereto by the return means C the frame 77 is positively released from the indicator wheel by an abutment 79' (Figure 5) engaging with one of the dogs 79.

It will be obvious that by the arrangement described as the stop 118 comes into contact with the calibrated edge 112$^b$ of the gauge plate the movement of the connector means will be arrested and as there will be no interruption in the rotation of the actuator wheel 64 the pin 88 carried thereby will ride out of the latch recess which will be facilitated through the force of the return means for the connector means 77, 85 and the latter will be immediately returned to its position of rest with the result that the contact of the linear movable stop 118 with the gauge plate will be only momentary and there will practically be no interference with the free movement of the scale beam which may be effected through a variation of the load on the conveyer passing over the load supporting platform 33.

The indicator through the movement of the indicator wheel is moved about the dial by intermittent movements of variable extent in accordance with the variations in the weight of the successive increments of material transported by the conveyer over the conveyer support connected to the scale beam, and to determine the total weight of the successive increments of material weighed a counter (shown in a general way at D) is provided to be actuated upon each complete revolution of the indicator or pointer about the dial and thus indicate the number of complete revolutions of the indicator, which multiplied by the unit of weight indicated by the dial will give the total weight of the material transported. The counter D is operated from the indicator wheel 76 by a pin 128 fixed in and extending laterally from said wheel engaging upon each revolution of the indicator wheel with one arm of a lever 129 pivotally supported upon one of the brackets for the detents 123 and normally urged by a spring 130 to a predetermined position and in engagement with a stop 131 for engagement by the pin 128. The lever is connected with the counter by a link 132 pivotally connected to the other arm of the lever and to an actuator for the prime mover of the counter, as at 133 in Figure 4.

In Figures 18 to 21, inclusive, I have shown a modified construction and arrangement of the slide 113 and the mounting of the gauge plate 112 thereon and having means combined therewith for effecting automatic adjustment of the gauge plate to change the inclination of the inclined or calibrated edge of said gauge plate, said adjustment being effected by variations in temperature to compensate for variations due to expansion and contraction of parts of the scale mechanism due to changes in atmospheric conditions, and especially changes effected in the balancing mechanism A, such as the contraction and expansion of the spring S as well as of the fluid in the dash pot when mercury is utilized since they both have a different factor in warm weather, as in summer, and in cold weather, as in winter. For this purpose a pair of metallic bars 134, 135 having different co-efficients of expansion are arranged in contiguous relation and suspended from one end from the upper portion of the slide 113, as at 136, the lower ends being engaged and secured in a bifurcation of a gauge member 137 with a face 138 of said gauge arranged in opposed relation to the edge 112ª of the gauge plate and inclined in a direction transversely of said gauge plate for engagement of the adjustable abutment 116. The abutment 116 is maintained in engagement with the gauge face 138 by springs 139 arranged at opposite sides of the gauge plate intermediate the ends thereof, one end of the springs being connected to the projecting ends of a pin 140 fixed in the gauge plate and the other end to screws 141 threaded into the slide 113. Through a contracting force of the parts 134, 135 the gauge member 137 is moved to the right as viewed in Figure 19 and toward to the left by an expansion force of said parts. In this arrangement the gauge plate 112 is pivotally supported upon a knife edge of a pivot member 142 fixed to the slide ears 114 engaging in a V recess 143 extending transversely of the gauge plate the walls of which recess incline at a greater angle than the wall of the knife edge pivot. To position the gauge plate in alinement with the linear movable stop 118 the adjustable abutment 119' is arranged in one of the slide ears 120. The other abutment 119 is in the form of a spring abutting against the side of the gauge plate opposite to the abutment 119, said spring being seated at the opposite end in a recess in the end of a member 144 threaded into an opening in the other slide ear 120.

The scale beam is constructed of a pair of parallel plates (Figure 7) secured together in spaced relation by the engagement of the head 51 interposed between the plates and at one end and a block 145 interposed and secured between the plates at the opposite ends, the rod 27 being connected to said end of the beam by engaging a hook formed at the end of the rod in an eye member 146 connected to said block by a strap 147. The improved fulcrum support for the beam comprises a pair of shouldered studs 148 secured in parallel relation in a plate 149 fixed upon the framework to extend transversely of the beam with the studs arranged at opposite sides of the beam, the free ends of said studs being of conical form. A plate 150 fixed upon the block 145 to extend transversely and laterally of the beam in parallel relation to the plate 149 carries a pair of studs 151 in alinement with the studs 148, said studs being secured in the plate by engaging reduced ends thereof in openings in the plate with the shoulders formed by the reduced ends abutting against the plate and nuts threaded onto the reduced ends at the opposite side of the plate, as clearly shown in Figures 8 and 9. The studs 151 extend downward from the plate 150 and have conical recesses in the ends with the inclination of the wall of said recess arranged at a greater angle than the wall of the conical ends of the studs 148, whereby the two studs will have a point contact, as at 152. It will be obvious that the arrangement of the fulcrum studs 148, 151 may be reversed; that is, the conical ends may be arranged on the studs 151 and the conical recesses in the ends of the studs 148.

In Figure 22 there is shown a modified arrangement of the beam fulcrum studs. In this arrangement the stud 151 is secured in its mounting plate 150 by riveting the end of the reduced portion and the end of the stud is conical instead of having a conical recess therein. The free end of the stud 148 is reduced in diameter and has a conical recess therein for the engagement of the conical end of stud 151 the angle of the latter being inclined at a less angle than the wall of the recess in stud 148. A sleeve 153 is engaged upon the reduced end of the stud 148 the outer wall of which is flush with the wall of greater diameter of the stud, and the sleeve extending above the reduced stud portion with the wall inclined inward at the same angle as the inclination of the wall of the recess. A sleeve 154 of flexible material, such as rubber, is engaged upon the studs to enclose the same and prevent entrance of foreign substance to the bearing point 152.

In Figures 23 to 24 there is shown a modification of the invention embodying manually operative means for actuating the indicator or register means, as well as a modification of the indicator means, the same being particularly adapted for weighers for intermittently weighing operations and platform scales. The shaft carrying the gear 75 from which the actuator wheel 64 is rotated instead of being driven by power means is operative manually by a crank 155 fixed to the shaft 74, said crank and thereby the shaft as well as the actuator being maintained in a normal position of rest by arranging the crank handle 156 as a detent by mounting the same to have axial sliding movement in a boss at the end of the crank, and said handle being adapted for releasable engagement in an opening in a bracket 157 fixed upon the framework. The indicator instead of being fixed upon the shaft 63 of the indicator wheel 76 is fixed upon a sectional shaft 158, 158' journalled in a transverse bracket 159 fixed upon the framework, the shaft sections being releasably connected by a clutch 160 shown of the conical type the movable member of which is rotatable with and slidably mounted on the shaft section 158 carrying the indicator 62. These shaft sections are operatively connected with the indicator wheel 76 by a wheel 161 fixed to the shaft 63 meshing with a pinion 162 fixed on shaft section 158'. The clutch 160 is normally maintained in operative clutching position by a pivoted lever 163 one arm of which has a bifurcation arranged for engagement in an annular recess in the hub of the movable clutch member, as shown at 164, and the lever being normally urged by a spring 165 to move said clutch member to clutch releasing position and the arm of the lever into engagement with an annular cam edge 166 arranged on the side of the gear 64, said cam being arranged so that it will maintain the lever in position during the period of connection of said wheel with the connector means 77, 85, to transmit the movement of the gear 64 to the indicator wheel 76, and to transmit movement of the lever to impart releasing movement to the movable clutch member just prior to the termination of each revolution of the actuator wheel 64 and thereby permit of movement of the indicator 62 to zero position in engagement with a stop 167 projecting from the face of the dial by a spring 168 coiled about the shaft section 158 with one end fixed to said shaft and the other end to a fixed part. To totalize and indicate the weight of successive weighings a counter D' is mounted upon the framework operatively connected with the shaft section 158' by a pinion 169 on a shaft connected with the prime mover of the counter, said pinion meshing with a gear 170 on the shaft section 158'.

While I have illustrated an embodiment of the invention as applied as a weigher for weighing and indicating or registering the weight of successive increments of material transported by a conveyer, and a weigher adapted for effecting intermittent weighings, and means to totalize the weight of successive weighings it will be obvious that various modifications may be made in construction and arrangement of parts and come within the scope of the invention, and that portions of the invention may be used without others without departing from the scope of the invention.

Having thus described my invention I claim:

1. In a weigher, a travelling conveyer, scale mechanism having a support for a portion of the conveyer, balance mechanism to maintain the scale mechanism in position of equilibrium with no load on the conveyer and to counterbalance the load on that portion of the conveyer travelling over the support, a weight indicator, actuating means for the indicator movable in synchronism with the travel of the conveyer and normally uncoupled from the indicator, means to couple the actuating means with the indicator at successive predetermined movements thereof corresponding with predetermined lengths of conveyer travel, and means operative by the movement of the scale mechanism out of its normal position of equilibrium by the load applied thereto by the conveyer to control the coupling of the indicator with and the actuation thereof by the actuating means proportional to the weight of the load applied to the scale mechanism and indicate the weight of the material transported by each successive predetermined length of conveyor travel.

2. In a weigher, a travelling conveyer, scale mechanism arranged to support a portion of the conveyer, balance mechanism operative to normally maintain the scale mechanism in a position of equilibrium with no load on the conveyer and to counterbalance a load on that portion of the conveyer travelling over the support, a weight indicator, a wheel rotatable in synchronism with the travel of the conveyer, means to couple said wheel with the indicator at successive predetermined lengths of conveyer travel, and means operative from the scale mechanism to determine the period of connection of said wheel and the actuation of the indicator to indicate the weight of successive increments of material transported by the conveyor.

3. In a weigher, a travelling conveyer, scale mechanism arranged with means to support a portion of the conveyer and means to normally maintain the scale mechanism in a position of equilibrium with no load applied to the conveyer and to counterbalance a load on that portion of the conveyer travelling over the support, a weight indicator, a rotatable wheel, means to connect the wheel with the indicator to actuate the latter at successive lengths of conveyer travel, and means operative by the movement of the scale mechanism out of its normal position of equilibrium proportional to the weight of the load on the conveyer to control the connection and actuation of the indicator by the wheel to indicate the weight of successive increments of material transported by the conveyer.

4. In a weigher, a travelling conveyer, scale mechanism arranged to support a portion of the conveyer, balancing mechanism operative to normally maintain the scale mechanism in a position of equilibrium with no load on the conveyer and counterbalance a load on that portion of the conveyer travelling over the support, a weight indicator, means movable in synchronism with the travel of the conveyer for actuating said indicator, means controlled by said indicator actuating means for connecting the actuating means with the indicator at successive predetermined lengths of conveyer travel, and means operative from the scale mechanism by the movement thereof out of its normal position of equilibrium by a load on the conveyer to control the connection of the indicator with and actuation thereof by the indicator actuating means to indicate the weight of successive increments of material transported by the conveyer.

5. In a weigher, a travelling conveyer, scale mechanism arranged to support a portion of the conveyer, balancing means to normally maintain the scale mechanism in a position of equilibrium with no load on the conveyer and counterbalance a load on that portion of the conveyer travelling over the support, a weight indicator, a wheel continuously rotatable in synchronism with the travel of the conveyer and adapted to have one revolution imparted thereto to a predetermined unit of conveyer travel, means operative from the wheel to connect the wheel with the indicator upon each revolution of the wheel, and means operative from the movement of the scale mechanism out of its position of equilibrium by a load on the conveyer to control the connection of the wheel with the indicator to actuate the latter to indicate the weight of successive increments of material transported by the conveyer.

6. In a weigher as claimed in claim 4, means to totalize and indicate the weight of the successive increments of material weighed and transported by the conveyer.

7. In a weigher as claimed in claim 5, means operative from the indicator to totalize and indicate the weight of the successive increments of material weighed and transported by the conveyer.

8. In a weigher, a travelling conveyer, scale mechanism arranged to support a portion of the conveyer, balancing means to normally maintain the scale mechanism in a position of equilibrium with no load on the conveyer and counterbalance a load on that portion of the conveyer travelling over the support, a weight indicator, a wheel continuously rotatable in synchronism with the travel of the conveyer, means operative from the wheel to connect the wheel with the indicator upon each revolution of the wheel, means for releasing said connecting means to disconnect the wheel from the indicator, and means operative from the movement of the scale mechanism out of its normal position of equilibrium by a load on the conveyer to control the actuation of said disconnecting means and the actuation of the indicator proportional to and indicate the weight of successive increments of material transported by the conveyer.

9. A weigher as claimed in claim 8, wherein the releasing means for disconnecting the wheel from the indicator embodies a linear movable member, and means operative from the movement of the scale mechanism out of position of equilibrium to control the actuation of said disconnecting means comprising a calibrated stop variably positioned in intersecting relation to the path of movement of and for engagement by the linear movable member.

10. In a weigher, a travelling conveyer, scale mechanism having means connected thereto for supporting a portion of the conveyer, balancing mechanism operative to normally maintain the scale mechanism in equilibrium with no load on the conveyer and to counterbalance a load on the conveyer, an indicator, and means for actuating said indicator operative from and in synchronism with the travel of the conveyer, and means controlled by the movement of the scale mechanism out of its position of equilibrium to indicate the weight of successive increments of material transported by the conveyer without interfering with the free movement of the scale mechanism.

11. A weigher as claimed in claim 8, wherein the continuously rotatable wheel is rotatable independently of the indicator, and the means to connect said wheel when the indicator comprises a wheel rotatable with the indicator, a to and fro movable member normally urged to a predetermined position in one direction, and means to releasably connect the continuously rotatable wheel with and move said member in the opposite direction, said member being arranged with means to couple the same with the indicator wheel when moved by the continuously rotatable member in the one direction and said means being automatically released from the indicator wheel when said member is moved in reverse direction.

12. In weighing mechanism, a weighing beam having means connected thereto to support a load, means to maintain the beam normally in a position of equilibrium with no load applied to the load supporting means and operative to resist and permit movement of the beam by an applied load proportional to the weight of the load, weight indicating means, means for actuating said indicating means normally disconnected therefrom and adapted to be operatively connected thereto to actuate the indicating means, and means controlled by the movement of the beam operative to disconnect the actuating means from the indicating means when the latter has been actuated proportional to the movement of the beam to indicate the weight of the load.

13. In weighing mechanism, the combination with a travelling material carrying conveyor, a weighing beam having means connected thereto for supporting a section of the conveyor, balance mechanism connected to the beam operative to maintain the beam in a predetermined position of equilibrium with no load applied to the load conveyor, and permit movement of the beam out of said position of equilibrium proportional to the weight of a load on the conveyor, means independent of the beam and balance mechanism to totalize and indicate the weight of successive weighings, means continuously movable in synchronism with the travel of the conveyor, means to couple said actuating means with the indicating means upon each successive predetermined length of conveyor travel for actuating said indicating means, and means operative from the movement of the beam to control the connection of the actuating means with and the actuation of the totalizing and indicating means by the actuating means proportional to the movement of the beam out of its predetermined position of equilibrium to weigh material transported by successive predetermined lengths of travel thereof as successive increments and totalize such successive increments.

14. In weighing mechanism as claimed in claim 13, the provision of means operative from the actuating means for the means to totalize the weight of successive weighings to indicate the weight of successive individual increments of material transported by the successive predetermined lengths of conveyor travel.

15. In weighing mechanism as claimed in claim 13, a second indicator to indicate the weight of individual loads, means to couple said second indicator to and operate the same from the actuating means for the means to totalize the weight of successive weighings, and means to return said individual load indicating means to zero position after the indicating of each load.

16. The combination with weighing mechanism embodying load supporting means and balance mechanism connected to the load supporting means to normally maintain the weighing mechanism in a position of equilibrium with no load applied to the load supporting means and counterbalance an applied load, weight indicating means, actuating means therefore, said indicating means and its actuating means being free of the weighing mechanism, and means operative from the connection of said balance mechanism with the load supporting means for co-operation with the actuating means for the indicating means to control the actuation of the indicating means by its actuating means without imposing the operating force for said actuating means as a load upon the weighing mechanism.

17. In weighing mechanism, a weighing beam having load supporting means connected thereto, balance mechanism connected to the beam to normally maintain the beam in a position of equilibrium with no load applied to the load supporting means and permit movement thereof out of said position of equilibrium proportional to the weight of a load applied thereto, weight indicating means, actuating means for the indicating means, said indicating means and its actuating means being free of the weighing mechanism, and means connected with and operative from the connection means of the balance mechanism with the beam for co-operation therewith of the actuating means for the indicating means to control the operation of said actuating means and thereby the actuation of the indicating means proportional to and indicate the weight of the load.

18. In weighing mechanism, a weighing beam having load supporting means connected thereto, means connected to the beam operative to maintain the beam in a normal position of equilibrium and permit movement thereof out of said position of equilibrium proportional to the weight of a load applied thereto, a weight indicator, actuating means for the indicator, means to releasably connect the indicator with its actuating means at a predetermined time in the actuation of the latter, means to release said connecting means, and means operative from and without interfering with the movement of the beam to control the release of the indicator from its actuating means and actuation of the indicator to indicate the weight of the load.

19. In weighing mechanism arranged with load supporting means, compensating resisting means operative to maintain the mechanism in a predetermined position of equilibrium with no load applied thereto and permit the weighing mechanism to move out of said position proportional to the weight of a load, a register, actuating means for the register normally uncoupled therefrom, means to couple said actuating means to the register at a predetermined point in the actuation thereof, and means operative by the movement of the weighing mechanism out of its normal position of equilibrium to control the coupling of the register actuating means with and the actuation of the register to indicate the weight of the load.

20. In weighing mechanism, a pivoted scale beam, load supporting means connected to one end of the beam, means connected to the opposite end of the beam operative to maintain the beam in a predetermined position of equilibrium with no load applied to the load supporting means and offer a compensating resisting force to and permit of movement of the beam out of said position when a load is applied to the load supporting means proportional to the weight of the load, a weight register, means independent and free of the weighing mechanism to actuate said register, and means positioned by the movement of the beam out of equilibrium by a load applied to the load supporting means adapted for co-operation therewith of the register actuating means to control the operation of the register actuating means and thereby the register proportional to the movement of the beam out of equilibrium and to indicate the weight of the load.

21. In weighing mechanism, a weighing beam arranged with means for supporting a load, balancing mechanism to normally maintain the beam in a position of equilibrium with no load and to counterbalance a load on a load supporting means and permit of movement of the beam out of its normal position of equilibrium proportional to the weight of the load, a weight indicator, a rotatable member, means operative from said member upon each revolution thereof to connect said member with and actuate the indicator, and means operative from the movement of the weighing beam out of its position of equilibrium to control the connection of the rotatable member with an actuation of the indicator to indicate the weight of the load.

22. In weighing mechanism, a weighing beam arranged with means for supporting a load and balance means operative to normally maintain the beam in a position of equilibrium with no load and off-set an applied load and permit movement of the beam out of said position of equilibrium proportional to the weight of the load; a weight indicator; a rotatable wheel; means to connect the wheel with and actuate the indicator adapted to be moved in one direction by the wheel at a predetermined point in each revolution thereof to actuate the indicator; yielding means to urge and move the connecting means in the opposite direction to a predetermined position of rest; and means positioned by the movement of the beam out of its position of equilibrium co-operating with the means for imparting return movement to the connecting means to control the movement of the connecting means by the wheel and the releasing of the connecting means from the wheel and indicator and thereby the actuation of the indicator proportional to and indicate the weight of the load.

23. Weighing mechanism as claimed in claim 22, wherein the means to connect the indicator with its actuating wheel embodies a linear movable member which coacts with the means positioned by the movement of the beam out of its position of equilibrium to variably limit the movement imparted to the connecting means by the indicator actuating wheel and control the actuation of the indicator.

24. Weighing mechanism as claimed in claim 22, wherein the means to connect the indicator with its actuating wheel includes a linear movable member, and the means positioned by the movement of the beam out of equilibrium comprises a calibrated stop variably positioned by the movement of the beam in intersecting relation to the path of movement of and for engagement by the linear movable member and thereby variably limit the movement imparted to the connecting means by the indicator actuating wheel and control the actuation of the indicator.

25. Weighing mechanism as claimed in claim 22, wherein the means to connect the indicator with its actuating wheel includes a linear movable member, and the means positioned by the movement of the beam out of equilibrium comprises a stop plate movable in a direction to intersect the path of movement of the linear movable member, said stop plate having one end extending in the direction of its movement and at a right angle to the direction of movement of the linear movable member and the opposite edge of the plate inclined and adapted for contact by the linear movable member, and said plate being variably positioned by the movement of the beam in intersecting relation to the path of movement of the linear movable member and variably limit the movement imparted to the connecting means by the indicator actuating wheel and control the actuation of the indicator.

26. Weighing mechanism as claimed in claim 22, wherein the means to connect the indicator with its actuator includes a member guided to have linear movement, and the means positioned by the movement of the beam out of position of equilibrium comprises a stop plate interposed in the connection of the balancing means with the beam guided to have movement at a right angle and in intersecting relation to the path of movement of the linear movable member, said plate having one edge extending in the direction of its movement and the opposite edge inclined and adapted for contact by the linear movable member and thereby limit the movement imparted to the connecting means by the indicator actuating wheel and control the actuation of the indicator.

27. Weighing mechanism as claimed in claim 22, wherein the means to connect the indicator with its actuator includes a member interposed in the connection of said connecting means with the means to impart return movement thereto and said member guided to have linear movement, and the means positioned by the movement of the beam out of position of equilibrium comprises a stop plate interposed in the connection of the balancing means with the beam, said plate having a straight edge for engagement with a fixed stop and guiding of said plate in a direction at a right angle and in intersecting relation to the movement of the linear movable member, and the edge of the stop plate opposite the straight edge being inclined and adapted movement of the linear movable member, to arrest and limit the indicator actuating movement of the connecting means imparted thereto by the indicator actuator.

28. Weighing mechanism as claimed in claim 22, wherein the means to impart return movement to the means for connecting the indicator with its actuator, comprises a spring, and means to retard the return movement of said connecting means.

29. Weighing mechanism as claimed in claim 22, wherein the means to impart return movement to the means for connecting the indicator with its actuator, comprises a spring, and a plunger connected in the connection of the spring with the connecting means and operating in a fluid containing receptacle to retard the return movement of said connecting means.

30. Weighing mechanism as claimed in claim 22, wherein the means to connect the indicator with its actuator wheel comprises a wheel in the movement of which the indicator participates, a pair of oppositely extending integral arms mounted to have to and fro movement and carrying means to lock the indicator wheel thereto when the connecting means is moved in one direction and adapted to be released from said wheel when reverse movement is imparted to the connecting means.

31. Weighing mechanism as claimed in claim 22, wherein the means to connect the indicator with its actuator wheel comprises a wheel in the movement of which the indicator participates, a pair of oppositely extending integral arms mounted to have to and fro movement and carrying means to impinge against and frictionally connect the arms to said wheel when the indicating means is moved in one direction and said means being adapted to be released from the wheel when return movement is imported to the connecting means.

32. Weighing mechanism as claimed in claim 22, wherein the means to connect the indicator with its actuator wheel comprises a wheel having a groove in the periphery and in the movement of which the indicator participates, a pair of oppositely extending integral arms mounted to have oscillatory movement, each arm having a part at the extremity to overhang the indicator wheel, shoes carried by said overhanging portion of the arms to engage in and frictionally impinge against the groove wheel to connect the wheel with the arms when the latter are moved in one direction, and said shoes adapted to be released from said wheel when reverse movement is imparted to the connecting means.

33. Weighing mechanism as claimed in claim 22, wherein the means to connect the indicator with its actuator wheel comprises a wheel in the movement of which the indicator participates, an oscillatory member carrying means to engage the indicator wheel to couple the same therewith when the connecting means is moved in one direction and released therefrom when reverse movement is imparted to the connecting means, a pivotally supported latch participating in the movement of said oscillatory member and yieldingly urged outward to a predetermined position, and means carried by the actuator wheel to co-operate with the latch to connect said wheel with the oscillating member.

34. Weighing mechanism as claimed in claim 22, wherein the means to connect the indicator with its actuator wheel comprises a wheel in the movement of which the indicator participates, an oscillatory member carrying means to engage the indicator wheel to couple the same therewith when the connecting means is moved in one direction and released therefrom when reverse movement is imparted to the connecting means, a pivotally supported latch participating in the movement of said oscillatory member, a spring to yieldingly urge said latch outward to a predetermined position, and means carried by the actuator wheel to co-operate with the latch to connect said wheel with the oscillatory member and said means adapted to move said latch against the action of its spring and ride off therefrom and disconnect the connecting means from the actuator wheel.

35. Weighing mechanism as claimed in claim 22, wherein the means to connect the indicator with its actuator wheel comprises a wheel in the movement of which the indicator participates, an oscillatory member carrying means to engage the indicator wheel to couple the same therewith when the connecting means is moved in one direction and released therefrom when reverse movement is imparted to the connecting means, a pivotally supported latch participating in the movement of said oscillatory member and having a recess in the outer wall thereof, a spring to yieldingly urge said latch outward to a predetermined position, a pin fixed in and extending laterally from the actuator wheel, said pin being adapted to engage in the latch recess to connect the wheel with the oscillatory member and adapted to ride out of the latch recess and move the latch against the actuation of its spring to release the wheel from the oscillatory member.

36. Weighing mechanism as claimed in claim 22, wherein the means to connect the indicator with its actuator wheel comprises a wheel in the movement of which the indicator participates, an oscillatory member carrying means to engage the indicator wheel to couple the same therewith when the connecting means is moved in one direction and released therefrom when reverse movement is imparted to the connecting means, a second oscillatory member to which the means for limiting the movement of the connecting means by the indicator wheel and to impart return movement thereto is connected, a connection between said oscillatory members to transmit the movement of one of said members to the other member, a spring influenced latch pivotally carried by said second oscillatory member and normally urged outward to a predetermined position, and means carried by the actuator wheel to co-operate with said latch to releasably connect the wheel with said second oscillatory member.

37. Weighing mechanism as claimed in claim 22, wherein the means to connect the indicator with its actuator wheel comprises a wheel in the movement of which the indicator participates, an oscillatory member carrying means to engage the indicator wheel to couple the same therewith when the connecting means is moved in one direction and released therefrom when reverse movement is imparted to the connecting means, a second oscillatory member to which the means for limiting the movement of the connecting means by the actuator wheel and to impart return movement thereto is connected, a connection between said oscillatory members to transmit the movement of one of said members to the other member and permit of a limited free movement between said members, a spring influenced latch pivotally carried by the second oscillatory member normally urged outward to a predetermined position and having a recess in the outer wall thereof, a pin fixed in and extending laterally from the actuator wall for engagement in the latch recess to connect the wheel with the connecting means and adapted to ride out of said latch recess and move the latch against the action of its spring to release the actuator wheel from the connecting means.

38. In weighing mechanism as claimed in claim 22, the provision of means operative from the connecting means for actuating the indicator wheel to totalize and indicate the weight of successive weighings.

39. Weighing mechanism as claimed in claim 22, wherein the indicator comprises a dial and a pointer one of which is movable relative to the other.

40. Weighing mechanism as claimed in claim 22, wherein the indicator comprises a fixed dial and a pointer movable relative to said dial.

41. Weighing mechanism as claimed in claim 22, wherein the means to connect the indicator with the actuator wheel includes a wheel in the movement of which the indicator participates, an oscillatory member to which the means for limiting the movement of the connecting means and imparting return movement thereto is connected, and co-operating means connected to said oscillatory member and the actuator wheel for releasably connecting the wheel with said oscillatory member, means carried by said oscillatory member to connect the same with the indicator wheel when movement is imparted to said member by the actuator wheel, and detents to co-operate with the indicator wheel to hold the same against retrograde movement, said detents being adapted to be automatically released from the wheel when movement is imparted thereto by the oscillatory member.

42. Weighing mechanism as claimed in claim 22 wherein the means to connect the indicator with the actuator wheel includes a wheel in the movement of which the indicator participates, an oscillatory member to which the means for limiting the movement of the connecting means and imparting return movement thereto is connected, and co-operating means connected to said oscillatory member and the actuator wheel for releasably connecting the wheel with said oscillatory member, shoes carried by said oscillatory member to frictionally impinge upon the indicator wheel when the oscillatory member is moved by the actuator wheel and automatically released when retrograde movement is imparted to the oscillatory member, and detents to frictionally cooperate with the indicator wheel to hold the same against retrograde movement, said detents being adapted to be automatically released from the wheel when movement is imparted thereto by the oscillatory member.

43. Weighing mechanism as claimed in claim 22, wherein the indicator embodies a rotatable element, a counter, and an actuator for the counter operated upon each revolution of the rotatable element of the indicator to advance the counter and thereby indicate the number of revolutions of said indicator element and the total of successive weighings.

44. Weighing mechanism as claimed in claim 22, wherein the means to connect the indicator with its actuator wheel includes a linear movable member, and the means positioned by the movement of the beam out of its position of equilibrim comprises a guide plate, a slide movable relative to the guide plate by the movement of the beam and in a direction at a right angle to the movement of the linear movable member, a gauge plate carried by said slide having an edge inclined to the movement of the slide and adapted to be variably positioned through the movement of the slide in intersecting relation to the movement of and for contact by the linear movable member to arrest and variably limit the movement of the connecting means imparted thereto by the indicator actuating wheel and control the actuation of the indicator.

45. Weighing mechanism as claimed in claim 22, wherein the means to connect the indicator with its actuating wheel includes a linear movable member, and the means positioned by the movement of the beam out of its position of equilibrim comprises a guide plate, a slide movable relative to the guide plate by the movement of the beam and in a direction at a right angle to the movement of the linear movable member, a gauge plate pivotally carried by the slide the outer edge of said plate being inclined relative to the slide and said plate being variably positioned by the slide in intersecting relation to the movement of and for contact by the linear movable member to arrest and limit the movement of the connecting means imparted thereto by the indicator actuating wheel and control the movement of the indicator.

46. Weighing mechanism as claimed in claim 22, wherein the means to connect the indicator with its actuating wheel includes a linear movable member, and the means positioned by the movement of the beam out of its position of equilibrium comprises a guide plate, a slide movable relative to the guide plate by the movement of the beam and in a direction at a right angle to the movement of the linear movable member, a gauge plate having one edge inclined relative to the slide and said plate being variably positioned by the slide through the movement imparted thereto by the beam and in intersecting relation to the movement of and for contact by the linear movable member to control the indicator actuating movement of said connecting means, and means to adjustably mount the gauge plate upon the slide to change the angle of the inclined wall thereof relative to the slide.

47. Weighing mechanism as claimed in claim 22, wherein the means to connect the indicator with its actuating wheel includes a slide mounted and guided to have sliding movement and carrying a stop, and the means positioned by the movement of the beam out of its position of equilibrium comprises a slide movable at a right angle to the first slide, a gauge plate carried by the second slide having an edge inclined relative to said slide and adjustable to change the angle of said inclined edge relative to the slide, said gauge plate being variably positioned in intersecting relation to the movement of and for engagement by the stop carried by the first slide to control the indicator actuating movement of the connecting means.

48. Weighing mechanism as claimed in claim 22, wherein the means to connect the indicator with its actuating wheel includes a slide carrying a stop and a guide frame in which the slide is mounted and guided for movement in a horizontal plane, and the means positioned by the movement of the beam out of its position of equilibrium comprises a vertically guide plate, a slide connected to the beam movable relative to said guide plate and at a right angle to the first slide, a gauge plate pivotally carried by and having the outer edge inclined relative to said slide and adapted to have adjustment outward from the slide to change the angle of the inclination of the inclined edge, said guide plate being variably positioned in intersecting relation to the movement of the first slide and for contact by the stop carried by said first slide to control the indicator actuating movement of the connecting means.

49. Weighing mechanism as claimed in claim 22, wherein the means to normally maintain the beam in a position of equilibrium and offset an applied load and permit of movement of the beam out of said position of equilibrium proportional to the weight of the load, comprises a fixed fluid carrying receptacle, a spring within and fixed at one end to the receptacle and at the other end to the beam, and a plunger within the receptacle carried by the connection of the spring with the beam.

50. Weighing mechanism as claimed in claim 22, wherein the means to normally maintain the beam in a position of equilibrium and offset an applied load and permit of movement of the beam out of said position of equilibrium proportional to the weight of the load, comprises a fluid carrying receptacle mounted to have longitudinal adjustment, a coiled spring within and secured at one end to the bottom of the receptacle and having a connection at the opposite end with the beam, a hollow plunger within the receptacle in enclosing relation to the spring and opened at the lower end to the receptacle, said plunger being carried by the connection of the spring with the beam and having ports in the closed end arranged with a valve closing into and opening outward from the plunger.

51. Weighing mechanism as claimed in claim 22, wherein the yielding means to move the connecting means to a predetermined position of rest, comprises a fixed fluid carrying receptacle, a spring within and fixed at one end to the receptacle and at the other end with the connecting means, and a plunger within the receptacle carried by the connection of the spring with the connecting means.

52. Weighing mechanism as claimed in claim 22, wherein the yielding means to move the connecting means to a predetermined position of rest, comprises a fluid carrying receptacle mounted to have longitudinal adjustment, a coiled spring within and fixed at one end to the bottom of the receptacle, a hollow plunger within the receptacle in enclosing relation to the spring and opened at the lower end to the receptacle, said plunger being carried by the connection of the spring with the connecting means and having ports in the closed end arranged with a valve opening into and closing outward from the plunger.

53. Weighing mechanism as claimed in claim 22, wherein the means to connect the indicator with its actuating wheel includes a slide mounted and guided to have sliding movement in a horizontal plane and carrying a stop, and the means positioned by the movement of the beam out of its position of equilibrium includes a slide connected to the beam and movable by the movement of the beam at a right angle to the first slide, a gauge plate pivotally carried at one end by the second slide and having the outer edge inclined relative to the slide, and means affected by changes in temperature to automatically adjust said gauge plate to change the angle of inclination of the inclined edge and compensate for changes in the elements of the weighing mechanism effected by atmospheric conditions.

54. Weighing mechanism as claimed in claim 22, wherein the means to connect the indicator with its actuating wheel includes a slide mounted and guided to have sliding movement in a horizontal plane and carrying a stop, and the means positioned by the movement of the beam out of its position of equilibrium includes a slide connected to the beam and movable by the movement of the beam at a right angle to the first slide, a gauge plate pivotally carried at one end by the second slide and having an outer edge inclined relative to the slide, and means affected by changes in temperature to automatically adjust said gauge plate to change the angle of inclination of the inclined edge and compensate for changes in the elements of the weighing mechanism effected by atmospheric conditions, said means comprising a pair of metallic plates arranged in contiguous relation and having different co-efficients of expansion and contraction suspended at one end from the gauge plate carrying slide in parallel relation to the gauge plate, a gauge member carried at the lower end of said plates having a face inclined in a direction transverse to the gauge plate, an abutment carried by the gauge plate for engagement with said inclined face of the gauge member, and means for yieldingly maintaining the plate in position with the abutment in engagement with the inclined face of the gauge member.

55. In weighing mechanism, a weighing beam arranged with means to support a load and balance means operative to normally maintain the beam in a position of equilibrium with no load and counterbalance an applied load and permit the beam to move out of its position of equilibrium proportional to the weight of the load, a rotatable weight indicator, yielding means to normally urge the indicator to a zero position, means controlled by the movement of the beam out of its position of equilibrium to actuate said indicator to indicate the weight of successive weighings, and means operative from the indicator actuating means upon the completion of the actuation of the indicator to indicate the weight of a load to release the indicator for return movement to zero position by its yielding actuating means.

56. Weighing means as claimed in claim 55, wherein the indicator actuating means comprises a shaft, a frame mounted on said shaft to have oscillatory movement, a wheel loose on said shaft co-operating means carried by said wheel and frame operative to releasably connect the wheel with and transmit the movement thereof to the frame upon each revolution of the wheel, a second wheel having an operative connection with the indicator, means carried by the frame to connect and transmit movement thereof transmitted thereto by the first wheel to the second wheel and thereby actuate the indicator, yielding means to impart return movement to and move the frame to a predetermined position of rest, a linear movable member in the connection of said yielding frame actuating means and the frame, a calibrated stop variably positioned by the beam in its movement out of position of equilibrium in intersecting relation to and for contact by the linear movable member to control the actuation of the frame by its actuating wheel and thereby of the indicator, and means controlled by the movement of the frame actuating wheel to release the indicator from its actuating wheel for return movement to zero position by its yielding actuating means.

57. Weighing mechanism as claimed in claim 55, wherein the indicator actuating means comprises a shaft, a frame mounted on said shaft to have oscillatory movement, a wheel loose on said shaft, co-operating means carried by said wheel and frame operative to releasably connect the wheel with and transmit movement thereof to the frame upon each revolution of the wheel, a second wheel fixed to the shaft, means carried by the frame to connect and transmit the movement thereof transmitted thereto by the first wheel to the second wheel and shaft, a gear fixed to the shaft, a shaft having a pinion fixed thereon meshing with the gear, a releasable clutch between said counter shaft and indicator, means to yieldingly urge the frame to a position of rest in a direction reverse to that imparted thereto by the actuating wheel, a linear movable member interposed in the connection of said means with the frame, a calibrated stop positioned by the movement of the beam out of its position of equilibrium in intersecting relation to the movement of and for contact by the linear movable member to limit the movement of the frame, and means operative from the movement of the actuator wheel to actuate the clutch to release the indicator from the counter shaft and the return of the indicator to zero position.

58. In weighing mechanism, a weighing beam arranged with means to support a load and balance means operative to normally maintain the beam in a position of equilibrium with no load and counterbalance an applied load and permit the beam to move out of its position of equilibrium proportional to the weight of the load, a rotatable weight indicator, yielding means to normally urge the indicator to a zero position, means controlled by the movement of the beam out of its position of equilibrium to actuate said indicator to indicate the weight of successive weighings, means operative from the indicator actuating means upon the completion of the actuation of the indicator to indicate the weight of a load to release the indicator for return movement to zero position by its yielding actuating means, and means operative from the indicator actuating means to totalize and indicate the weight of successive weighings.

59. Weighing means as claimed in claim 55, wherein the indicator actuating means comprises a shaft, a frame mounted on said shaft to have oscillatory movement, a wheel loose on said shaft, co-operating means carried by said wheel and frame operative to releasably connect the wheel with and transmit movement thereof to the frame upon each revolution of the wheel, a second wheel having an operative connection with the indicator, means carried by the frame to connect and transmit the movement thereof transmitted thereto by the first wheel to the second wheel and thereby actuate the indicator, yielding means to impart return movement to and move the frame to a predetermined position of rest, a linear movable member in the connection of said yielding frame actuating means and the frame, a calibrated stop variably positioned by the beam in its movement out of position of equilibrium in intersecting relation to and for contact by the linear movable member to control the actuation of the frame by its actuating wheel and thereby of the indicator, means controlled by the movement of the frame actuating wheel to release the indicator from its actuating wheel for return movement to zero position by its actuating means, and means operative from the indicator actuating means to totalize and indicate the weight of successive weighings.

60. Weighing mechanism as claimed in claim 55, wherein the indicator actuating means comprises a shaft, a frame mounted on said shaft to have oscillatory movement, a wheel loose on said shaft, co-operating means carried by said wheel and frame operative to releasably connect the wheel with and transmit movement thereof to the frame upon each revolution of the wheel, a second wheel fixed to the shaft, means carried by the frame to connect and transmit the movement thereof transmitted thereto by the first wheel to the second wheel and shaft, a gear fixed to the shaft, a shaft having a pinion fixed thereon meshing with the gear, a releasable clutch between said counter shaft and indicator, means to yieldingly urge the frame to a position of rest in a direction reverse to that imparted thereto by the actuating wheel, a linear movable member interposed in the connection of said means with the frame, a calibrated stop positioned by the movement of the beam out of its position of equilibrium in intersecting relation to the movement of and for contact by the linear movable member to limit the movement of the frame, means operative from the movement of the actuator wheel to actuate the clutch to release the indicator from the counter shaft and the return of the indicator to zero position, a counter, and gearing to connect the counter with the counter shaft to be driven by the indicator actuating means to totalize and indicate the weight of successive weighings.

61. In a weigher, a travelling conveyor, scale mechanism arranged to support a portion of the conveyor, balancing means to normally maintain the scale mechanism in a position of equilibrium with no load on the conveyor and counterbalance a load on that portion of the conveyor supported by the scale mechanism, weight indicating means reciprocatory means movable from and in synchronism with the travel of the conveyor upon successive predetermined lengths of conveyor travel, means attached to the scale mechanism and variably positioned by the movement of the scale mechanism for controlling the length of stroke of said reciprocatory means proportionate to the weight of the load supported by the scale mechanism, means operative upon a predetermined length of conveyor travel for connecting the indicating means with the reciprocatory means during its movement in one direction and co-operating with the means variably positioned by the scale mechanism to disconnect the indicating means from the reciprocating means and permit of movement thereof in the opposite direction.

Signed at the city of New York, in the county of New York and State of New York, this twelfth day of April, 1927.

EDWIN H. MESSITER.